G. E. BAIRD.
TOOL HOLDER.
APPLICATION FILED NOV. 29, 1913.
1,202,772.
Patented Oct. 31, 1916.
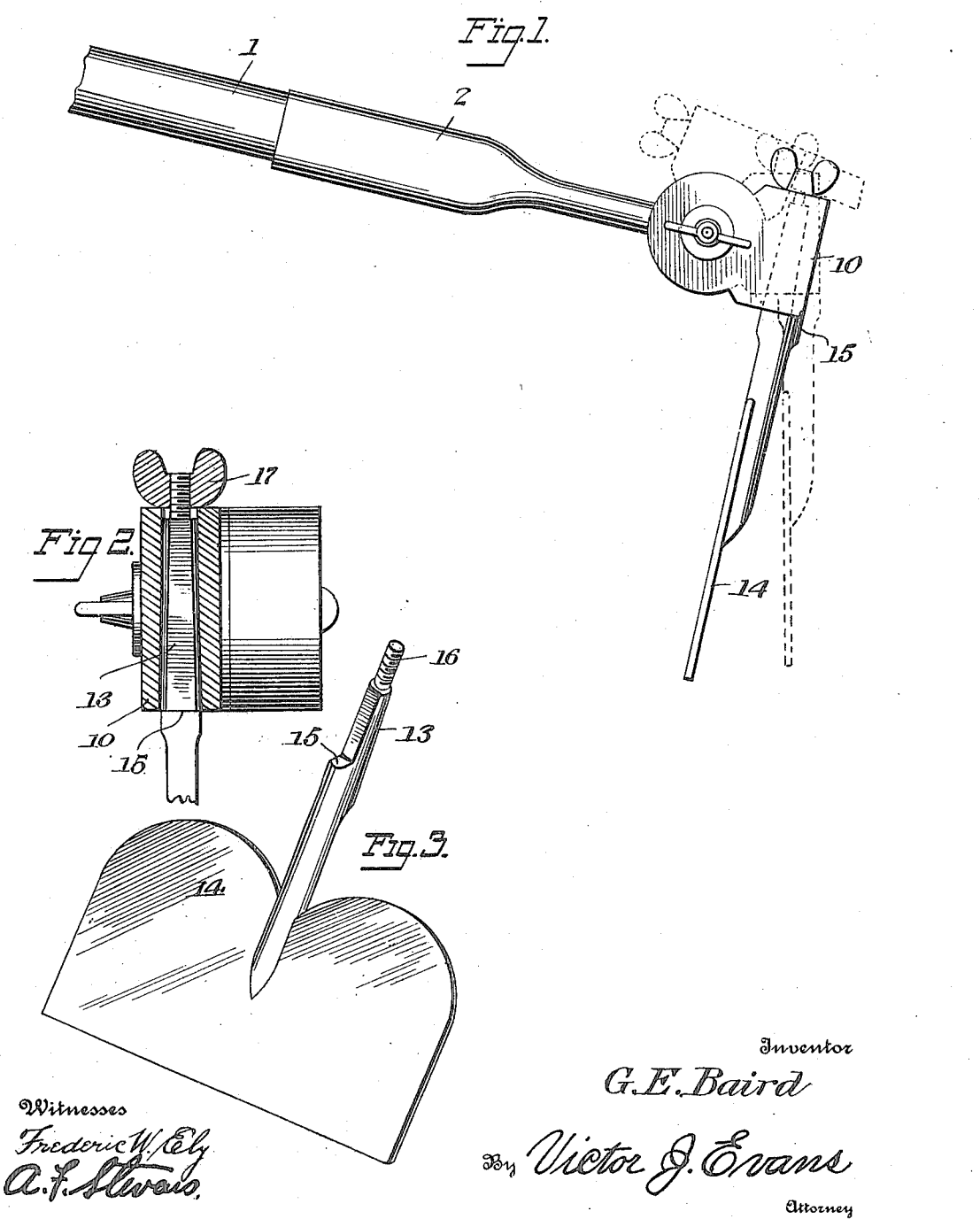
Witnesses
Frederic W. Ely
A. F. Stevens
Inventor
G. E. Baird
By Victor J. Evans
Attorney

UNITED STATES PATENT OFFICE.

GEORGE E. BAIRD, OF BILLINGS, MONTANA.

TOOL-HOLDER.

1,202,772. Specification of Letters Patent. Patented Oct. 31, 1916.

Application filed November 29, 1913. Serial No. 803,747.

*To all whom it may concern:*

Be it known that I, GEORGE E. BAIRD, a citizen of the United States, residing at Billings, in the county of Yellowstone and State of Montana, have invented new and useful Improvements in Tool-Holders, of which the following is a specification.

This invention relates to improvements in tool holders and has for its object to provide a simple, inexpensive and highly efficient device of this character so shaped that it will permit a proper bearing to be obtained for a suitable garden tool against the handle.

Another object of my invention is to provide means for removably securing a tool upon a tool handle in such a manner as to relieve the same from uneven stress in the act of applying the tool in use.

With the above and other objects in view the invention consists in the combination, arrangement and details of construction shown in the specification and then more particularly pointed out in the appended claim.

In the drawings wherein similar reference numerals designate similar parts throughout the respective views, Figure 1 is a side elevation of my invention, Fig. 2 is a sectional view of a tool clamping means, and Fig. 3 is a perspective view of a tool having a shank adapted to be applied to the socket member of the handle.

Referring to the drawings which are merely illustrative of my invention a suitable handle 1 is shown secured at one end in a ferrule 2. Said ferrule is provided with a head 10. Said head is formed with a shank receiving bore of a suitable configuration to hold and secure the shank of a suitable garden tool.

For the purpose of illustration a hoe is illustrated although any other form of tool may be used the conspicuous feature of my invention being to provide upon the tool a shank having its blade preferably formed flush with one side of the shank, the tool blade being designated 14. The shank is also formed with a shoulder 15 upon its opposite side and also has an outwardly tapering portion 13. The tapering portion 13 of the shank consists of a straight and a rounded edge while the tool head 10 has its bore correspondingly shaped to receive the straight and rounded edges of the tapering portion 13 to dispose the shoulder 15 against the end side of the tool head substantially flush with its outer end. The shank 13 is also formed with a reduced threaded extension 16 which projects beyond the head 10. An adjusting wing nut 17 is secured upon said threaded extension and is adapted to clamp the shank tightly in its bore formed in the tool head 10. In this way the tool is considerably reinforced by the tool head and clamped very tightly to the latter so as to have no independent movement whatsoever, and owing to this construction the force or pressure applied against the tool blade is uniformly taken up by the blade owing to the secure support it has upon the tool head.

Numerous modifications can be resorted to in practice without departing in principle from the details of construction herein disclosed.

Having thus described the invention, what I claim is:

In combination, a blade carrier, a shank having a blade formed flush with one side thereof and a shoulder formed upon its opposite side, said shank having a tapering portion, said tapering portion of the shank consisting of a straight and rounded edge, said blade carrier being provided with a bore correspondingly-shaped to receive the straight and rounded edges of said tapering portion to dispose said shoulder against the end side of said carrier substantially flush with its outer end, a reduced threaded extension formed upon said shank and projecting beyond said blade carrier, and a nut secured upon said threaded extension and clamping said shank tightly in said blade carrier.

In testimony whereof I affix my signature in presence of two witnesses.

GEORGE E. BAIRD.

Witnesses:
 THOS. F. O'CONNOR,
 W. H. RALSTON.

Copies of this patent may be obtained for five cents each, by addressing the "Commissioner of Patents, Washington, D. C."